United States Patent
Willis et al.

(10) Patent No.: US 12,311,958 B2
(45) Date of Patent: *May 27, 2025

(54) PARAMETER SETS FOR VEHICLES BASED ON SENSOR DATA

(71) Applicant: MALIKIE INNOVATIONS LIMITED, Dublin (IE)

(72) Inventors: Edward Snow Willis, Ottawa (CA); Christopher Scott Travers, Ottawa (CA); Yuhui Liu, Waterloo (CA); Ning Erin Ren, Kitchener (CA); Hashim Mohammad Qaderi, Kitchener (CA); Prabhul Dev, Ottawa (CA); Karthik Velakur Sambamoorthy, Waterloo (CA); Parvez Ahmed, Brampton (CA); Eric Yeung, Whitby (CA); Evgueni Eugene Markine, Cambridge (CA); Scott Hutchens, Ottawa (CA)

(73) Assignee: Malikie Innovations Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,336

(22) Filed: Jun. 23, 2022

(65) Prior Publication Data

US 2022/0315019 A1    Oct. 6, 2022

Related U.S. Application Data

(63) Continuation of application No. 16/704,095, filed on Dec. 5, 2019, now Pat. No. 11,400,947, which is a (Continued)

(51) Int. Cl.
*B60W 50/00* (2006.01)
*B60W 10/04* (2006.01)
(Continued)

(52) U.S. Cl.
CPC ........ *B60W 50/0098* (2013.01); *B60W 10/04* (2013.01); *B60W 10/10* (2013.01);
(Continued)

(58) Field of Classification Search
None
See application file for complete search history.

(56) References Cited

U.S. PATENT DOCUMENTS

| 5,420,794 A | 5/1995 | James |
| 7,139,660 B2 | 11/2006 | Sarkar |

(Continued)

FOREIGN PATENT DOCUMENTS

| DE | 102014215259 A1 | 2/2016 |
| DE | 102016006870 A1 | 2/2017 |

(Continued)

OTHER PUBLICATIONS

AA1CAR, Engine Coolant Sensors dated on or before Feb. 2017 (13 pages).

(Continued)

*Primary Examiner* — Abdhesh K Jha
(74) *Attorney, Agent, or Firm* — Conley Rose, P.C.; J. Robert Brown, Jr.

(57) ABSTRACT

In some examples, a controller receives measurement data from a sensor on a vehicle, determines, based on the measurement data, a condition of usage of the vehicle, and selects a parameter set from among a plurality of parameter sets based on the determined condition of usage of the vehicle, the plurality of parameter sets corresponding to different conditions of usage of the vehicle, where each parameter set of the plurality of parameter sets includes one or more parameters that control adjustment of one or more (Continued)

respective adjustable elements of the vehicle. The controller causes application of the selected parameter set on the vehicle.

7 Claims, 5 Drawing Sheets

Related U.S. Application Data continuation of application No. 15/486,990, filed on Apr. 13, 2017, now Pat. No. 10,569,786.

(51) Int. Cl.
*B60W 10/10* (2012.01)
*B60W 10/18* (2012.01)
*B60W 10/22* (2006.01)
*B60W 10/30* (2006.01)
*H04W 84/00* (2009.01)

(52) U.S. Cl.
CPC ............ *B60W 10/18* (2013.01); *B60W 10/22* (2013.01); *B60W 10/30* (2013.01); *B60W 2050/0075* (2013.01); *B60W 2510/0642* (2013.01); *B60W 2510/1005* (2013.01); *B60W 2510/182* (2013.01); *B60W 2510/22* (2013.01); *B60W 2510/30* (2013.01); *B60W 2530/20* (2013.01); *B60W 2555/40* (2020.02); *B60W 2556/10* (2020.02); *B60W 2556/45* (2020.02); *B60W 2710/065* (2013.01); *B60W 2710/1005* (2013.01); *B60W 2710/182* (2013.01); *B60W 2710/22* (2013.01); *B60W 2710/30* (2013.01); *B60W 2756/10* (2020.02); *H04W 84/005* (2013.01)

(56) References Cited

U.S. PATENT DOCUMENTS

| | | |
|---|---|---|
| 7,685,162 B2 | 3/2010 | Heider |
| 7,873,452 B2 | 1/2011 | Hawkins et al. |
| 8,560,155 B2 | 10/2013 | Kedar-Dongarkar et al. |
| 9,079,505 B1 | 7/2015 | Hyde et al. |
| 9,110,774 B1 | 8/2015 | Bonn |
| 9,428,197 B2 | 8/2016 | Chen |
| 9,908,528 B2 | 3/2018 | Kelly |
| 2005/0274553 A1 | 12/2005 | Salman et al. |
| 2012/0323413 A1 | 12/2012 | Kedar-Dongarkar |
| 2016/0200166 A1 | 7/2016 | Stanek et al. |
| 2017/0137026 A1 | 5/2017 | Hemes |
| 2017/0356375 A1* | 12/2017 | Glugla ............. B60W 30/1882 |
| 2018/0022187 A1 | 1/2018 | Connell |
| 2018/0043946 A1 | 2/2018 | Barber |
| 2018/0099646 A1 | 4/2018 | Karandikar |
| 2018/0194357 A1* | 7/2018 | Hall ...................... B60W 50/14 |
| 2018/0201264 A1 | 7/2018 | Schoenly |
| 2018/0281669 A1 | 10/2018 | Dziurda |
| 2019/0009842 A1 | 1/2019 | Biancalana |
| 2019/0049981 A1 | 2/2019 | Fischer |
| 2019/0233023 A1 | 8/2019 | Heubener |
| 2020/0283078 A1 | 9/2020 | Czapka |
| 2020/0369331 A1 | 11/2020 | Ferri |

FOREIGN PATENT DOCUMENTS

| | | | |
|---|---|---|---|
| KR | 20100093889 A1 * | 8/2010 | ........... B60G 17/052 |
| WO | 2012173881 A1 | 12/2012 | |
| WO | 2016100668 | 6/2016 | |

OTHER PUBLICATIONS

Chris Perkins, Koenigsegg Can Remotely Adjust the Suspension on Their Cars From Anywhere in the World, Dec. 13, 2016 (10 pages).
Edward Snow Willis et al., U.S. Appl. No. 15/486,985 entitled Parameter Sets for Vehicles filed Apr. 13, 2017 (31 pages).
ISA/CA, International Search Report and Written Opinion for PCT/CA2018/050429 dated Jun. 28, 2018 (11 pages).
European Patent Office, Extended European Search Report for Appl. No. 18784730.6 dated Nov. 30, 2020 (7 pages).
Office Action for European Patent Application No. 18784730.6, Nov. 29, 2023, 4 Pages.

\* cited by examiner

PARAMETER SETS FOR VEHICLES BASED ON SENSOR DATA

CROSS REFERENCE TO RELATED APPLICATION

This is a continuation of U.S. application Ser. No. 16/704,095, filed Dec. 5, 2019, which is a continuation of U.S. application Ser. No. 15/486,990, filed Apr. 13, 2017, U.S. Pat. No. 10,569,786, which are both hereby incorporated by reference.

BACKGROUND

A vehicle such as a car or other type of vehicle can be used to carry people or goods from one location to another location. A vehicle can include a large number of separate parts, including mechanical parts, electronic control units (ECUs), and other components. The ECUs are used to control various different functions of a vehicle. Operational components, including ECUs, other electronic components, and so forth, of vehicles can be configured using configuration settings. Similarly, other types of electronic devices, such as Internet of Things (IoT) devices, can also be configured using configuration settings.

BRIEF DESCRIPTION OF THE DRAWINGS

Some implementations of the present disclosure are described with respect to the following figures.

Figure 1:
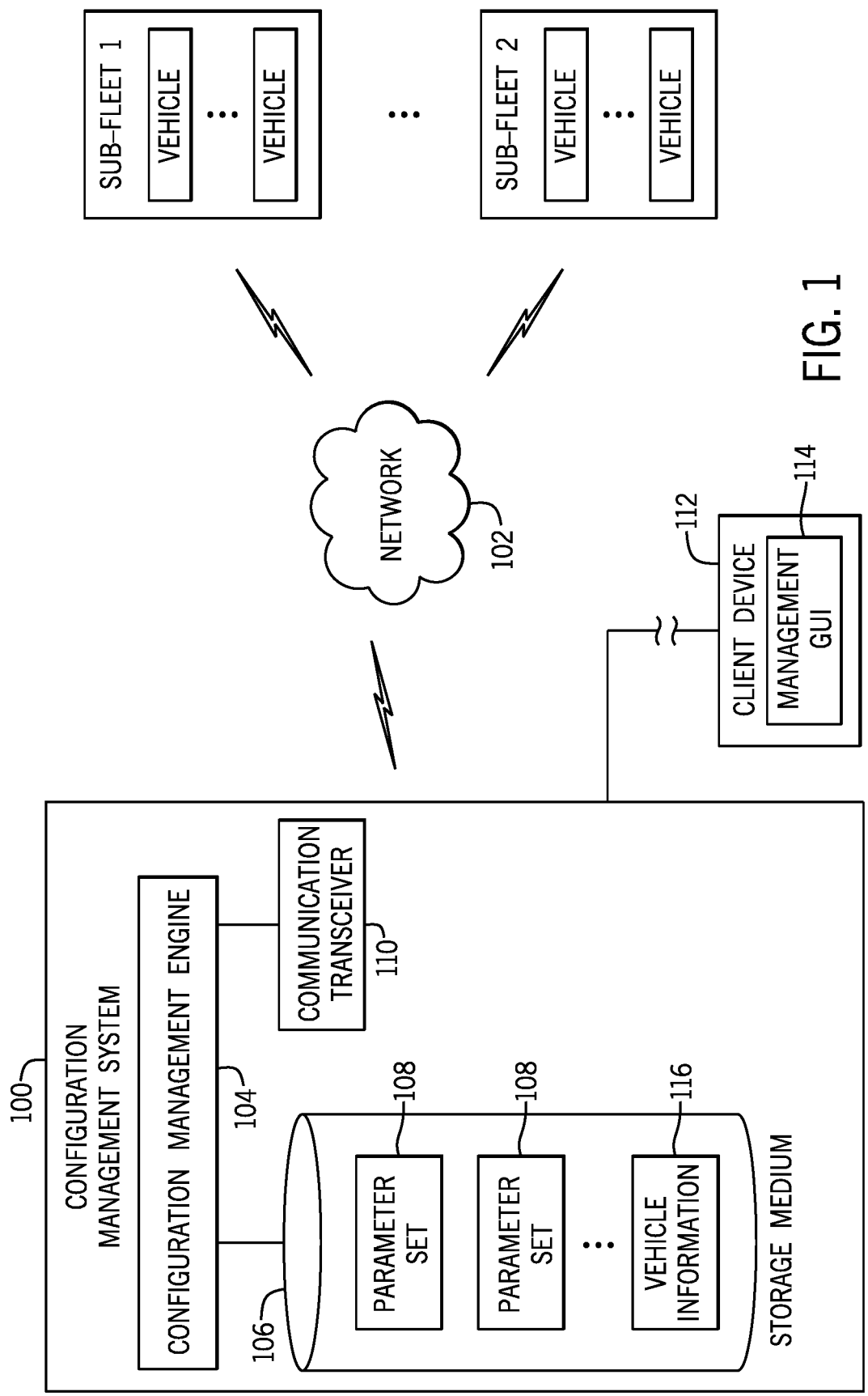
FIG. 1 is a block diagram of an example arrangement to provide configuration settings to vehicles according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A vehicle can refer generally to any machine that is used to carry people, goods, and/or other payload from one physical location to another physical location. Examples of vehicles include any or some combination of the following: a truck, a trailer, a tractor, a car, a railed vehicle (e.g., a train), a watercraft (e.g., a ship, a submarine), an aircraft, a spacecraft, and so forth. A vehicle can also refer to a drone, which is an un-manned vehicle that can be used to perform various different actions. A vehicle can include wheels to move between different physical locations over land. Alternatively, a vehicle can include structures such as wings to allow the vehicle to fly through the air, or floatation structures to sail on or through water.

In addition to a large number of mechanical parts, a vehicle can also include various operational components, such as electronic control units (ECUs) or other electronic components, as well as other components that can operate to perform tasks relating to the vehicle. In the present disclosure, ECUs can also be referred to as "controller units." An ECU can refer to any embedded computing system that is part of the vehicle to control one or more subsystems in the vehicle. An ECU can be implemented with a processor, or with multiple processors. Examples of subsystems that can be controlled by ECUs include an engine of a vehicle, a transmission of the vehicle, a brake subsystem of the vehicle, a valve of the vehicle, an air-conditioning subsystem of the vehicle, a navigation subsystem of the vehicle, and so forth.

An operational component can be configured to operate at one of various different settings based on a configuration parameter (or a set of configuration parameters) provided to the operational component. As used here "a configuration parameter set" (or more simply, a "parameter set") can include one or more configuration parameters that control a setting of an operational component. For example, a parameter set can include one or more configuration parameters that control an idle speed of an engine, a timing of a valve, operation of a brake (e.g., how much pressure to apply, etc.), operation of an air-conditioning system, operation of a navigation subsystem, operation of an adjustable suspension, operation of an adjustable aerodynamic shroud, pressure of a tire, and so forth.

Generally, a manufacturer or other operator of a vehicle can provide parameter sets to the vehicle that are based on a range of operating conditions that the vehicle is expected to operate under. The parameter sets are intended to strike a balance between the different types of conditions that the vehicles may encounter. As a result, the parameter sets provided to the vehicle may not be optimal for certain conditions. As a result, the efficiency of the vehicle may suffer under certain conditions, such as reduced miles-per-gallon performance, operation that increases wear on components, and so forth. For an enterprise (such as a shipper, distributor, retailer, and so forth) that operates a large number of vehicles (such as to carry cargo or people), even a relatively small reduction in efficiency can substantially increase costs to the enterprise.

In accordance with some implementations of the present disclosure, solutions are provided to selectively provide parameter sets to vehicles for respective conditions of usage of the vehicles, which can lead to increased efficiency of operation of the vehicles, operation that results in reduced wear of components, and so forth. For example, for a first condition of usage of a vehicle, a first parameter set can be provided to control an operational component of the vehicle.

For a different second condition of usage of a vehicle, a second parameter set can be provided to control the operational component of the vehicle.

In some implementations, the selective provision of parameter sets can be performed in a supervised manner (referred to as "supervised" solutions of providing parameter sets), in which a system is able to predict an expected target condition of usage of a vehicle (or vehicles), and can select a parameter set to provide to the vehicle(s) based on the expected target condition of usage of the vehicle. In alternative implementations, solutions are provided in which the selection of a parameter set from multiple parameter sets for a vehicle can be performed in an unsupervised manner or semi-supervised manner (referred to as "autonomous" solutions of providing parameter sets), where a condition of usage of a vehicle can be determined based on sensor information provided by one or more sensors of the vehicle.

Supervised Provision of Configuration Parameter Sets

In some implementations, with the use of supervised solutions to provide parameter sets to vehicles, a fleet administrator is able to manage respective sub-fleets of a fleet of vehicles, where each sub-fleet of the vehicles to be operated under a specific condition or conditions. For example, a first sub-fleet of the vehicles may be operated as long-haul vehicles, and another sub-fleet of vehicles can be operated as short-haul vehicles, where "long-haul" refers to a travel distance of greater than a specified threshold, and "short-haul" refers to a travel distance of less than a specified threshold.

In further examples, a sub-fleet of vehicles can be operated in hot weather (a condition where a temperature of an environment is greater than a specified temperature threshold), while another sub-fleet of vehicles can be operated in cold weather (a condition where the temperature of the environment is less than a specified temperature threshold).

In further examples, a sub-fleet of vehicles can be operated at high altitude (altitude greater than a specified altitude threshold), while another sub-fleet of vehicles can be operated at low altitude (altitude less than a specified altitude threshold). In other examples, a sub-fleet of vehicles can be operated as high-load vehicles, while another sub-fleet of vehicles can be operated in as low-load vehicles, where "high load" can refer to a load (of cargo or people) of the vehicle that exceeds a specified weight or a specified percentage of carrying capacity), while "low load" can refer to a load of the vehicle that is less than a specified weight or percentage of loading.

In additional examples, a sub-fleet of vehicles can be operated on a first type of terrain (e.g., a hilly or mountainous terrain), while another sub-fleet of vehicles can be operated in another type of terrain (e.g., a flat terrain). Different terrains can also refer to different types of pavement on which the vehicles are to be operated, such as smooth pavement, gravel pavement, or pavement filled with potholes.

For the different sub-fleets that are intended to be operated under different conditions, different parameter sets can be selected and provided to the respective sub-fleets of vehicles. In this manner, each sub-fleet of vehicles can be operated in a more optimal manner for a specific expected condition of usage, which can increase the efficiency of each vehicle, reduce wear of components of the vehicle, and so forth.

Although reference is made to providing configuration settings to vehicles in some examples, it is noted that solutions according to some implementations of the present disclosure are also applicable to select configuration settings to configure Internet of Things (IoT) devices. An IoT device can refer generally to an electronic device that is designed or configured to achieve a specific target operation, unlike general-purpose computers (e.g., notebook computers, tablet computers, desktop computers, server computers) or smartphones. Examples of IoT devices include sensors to measure respective parameters (e.g., temperature, pressure, humidity, location, etc.), actuators used to actuate devices between different states (e.g., a thermostat to operate an air conditioning and/or heating system), cameras, household appliances, and so forth. A vehicle is a type of IoT device. Whereas a computer or smartphone (or other similar general-purpose electronic device) can be loaded with different types of applications (at the request of user), an IoT device is configured to execute a specific application to perform the specific target operation of the IoT device; in other words, in some examples, an IoT device is usually pre-loaded with an application (or a set of applications), and a user is unable to download a different application (other than updates to update the pre-loaded application(s)) onto the IoT device.

FIG. 1 is a block diagram of an example arrangement that includes a configuration management system 100 that can be used to manage configuration settings of vehicles in various sub-fleets of vehicles, where a sub-fleet 1 of vehicles and a sub-fleet 2 of vehicles is shown in the example of FIG. 1. The configuration management system 100 is able to deliver various parameter sets to vehicles over a network 102, which can be a wireless network or a wired network.

A wireless network can include a cellular access network or a wireless local area network (WLAN). An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks.

A WLAN can operate according to the Institute of Electrical and Electronic Engineers (IEEE) 802.11 or Wi-Fi Alliance Specifications. In other examples, other types of wireless networks can be employed, such as a Bluetooth link, a ZigBee network, and so forth. Additionally, some wireless networks can enable cellular Internet of Things (IoT), such as wireless access networks according to LTE Advanced for Machine-Type Communication (LTE-MTC), narrowband IoT (NB-IoT), and so forth.

The configuration management system 100 includes a configuration management engine 104 which is able to selectively deliver parameter sets to respective vehicles in different sub-fleets, based on a target condition of usage of vehicles in each sub-fleet.

The configuration management engine 104 can include a hardware processing circuit, where a hardware processing circuit can refer to any or some combination of the following: a microprocessor, a core of a multi-core microprocessor, a microcontroller, a programmable integrated circuit device, a programmable gate array, or another type of hardware processing circuit. Alternatively, the configuration management engine 104 can include a combination of a hardware processing circuit and machine-readable instructions (software and/or firmware) executable on the hardware processing circuit, A storage medium 106 stores various parameter sets 108. The storage medium 106 can be implemented with a disk drive, a collection of disk drives, a solid state memory, a collection of solid state memories, and/or other types of storage media.

The parameter sets 108 can provide different parameters for a specific operational component of vehicles. For example, the parameter sets 108 can relate to different configuration settings of an engine, a transmission, and so forth.

The storage medium 106 can store multiple collections of parameter sets for respective different operational components of vehicles, where each collection of parameter sets specify different configuration settings for a respective operational component of a vehicle.

The storage medium 106 can be part of the configuration management system 100, or can be remote from the configuration management system 100, but is accessible by the configuration management system 100, such as over the network 102.

The configuration management system 100 also includes a communication transceiver 110 that allows the configuration management system 100 to communicate over the network 102 with the vehicles. The communication transceiver 110 can include a wireless transceiver to transmit and receive wireless signals, or a wired transceiver to communicate over a wired network.

FIG. 1 further shows a client device 112 that is coupled to the configuration management system 100. The client device 112 can be a user device, such as a notebook computer, desktop computer, tablet computer, smartphone, and so forth, which can be used by a user (e.g., a fleet administrator) to manage configurations of vehicles. The client device 112 can execute an application that allows the client device 112 to interface with the configuration management engine 104. The application executed on the client device 112 can present a management graphical user interface (GUI) 114, which allows the client device 112 to interact with the configuration management engine 104.

In some examples, the management GUI 114 can be used by an administrator to define the parameter sets 108 and/or define sub-fleets of vehicles (by assigning specific vehicles to specific sub-fleets). The management GUI 114 allows the administrator to provide information relating to vehicles to the configuration management system 100, which can store the information as vehicle information 116 in the storage medium 106, for example. The vehicle information 116 relates can identify sub-fleets of vehicles, where each sub-fleet can be identified by a sub-fleet name, and the vehicles within a given sub-fleet can also be identified with vehicle identifiers or vehicle names, for example. The vehicle information 116 can also indicate, for each sub-fleet of vehicles, the expected condition of usage of the sub-fleet (e.g., long-haul versus short-haul, high altitude versus low altitude, etc.).

The client device 112 can be directly connected to the configuration management system 100, or the client device 112 can be coupled over the network 102 to the configuration management system 100.

Although FIG. 1 shows just one client device 112 coupled to the configuration management system 100, it is noted that in other examples, multiple client devices can be coupled to the configuration management system 100 to allow multiple administrators to manage provision of parameter sets to respective vehicles.

Figure 2:
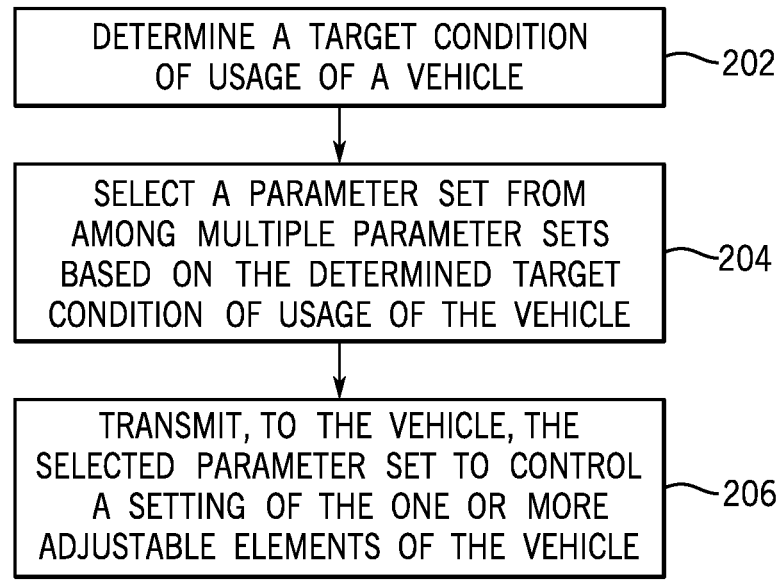
FIG. 2 is a flow diagram of a process of providing a configuration setting to a vehicle, according to some implementations.

FIG. 2 is a flow diagram of an example process, which can be performed by the configuration management engine 104, for example. The configuration management engine 104 determines (at 202) a target condition of usage of a vehicle. This determined target condition of usage can be based on information provided by an administrator, such as through the management GUI 114 of the client device 112 shown in FIG. 1. The information provided by the administrator can be stored as part of the vehicle information 116 in the storage medium 106 (FIG. 2).

The configuration management engine 104 selects (at 204) a parameter set from among multiple parameter sets (e.g., the multiple parameter sets 108 in the storage medium 106) based on the determined target condition of usage of the vehicle. The multiple parameter sets correspond to different conditions of usage of the vehicle, where each parameter set includes one or more parameters that control operation of an operational component of the vehicle. For example, the one or more parameters of a parameter set can control adjustment of one or more respective adjustable elements in the operational components of the vehicle. Examples of adjustable elements can include an engine element that controls the idling speed of the engine, a valve element that controls the timing of a valve, a brake element that controls a force applied on the brake, a suspension element to control the softness or rigidity of an adjustable suspension, a shroud element to adjust an adjustable aerodynamic shroud, a pressure pump to control a pressure of a tire, and so forth.

The configuration management engine 104 transmits (at 206), to the vehicle, the selected parameter set to control a setting of the one or more adjustable elements of the vehicle. The transmission of the selected parameter set can be performed over the network 102 shown in FIG. 1.

As noted above, the different conditions of usage of the vehicle can include different temperatures of environments in which the vehicle is to be operated, and the multiple parameter sets 108 can control adjustment of one or more respective adjustable elements of the vehicle for the respective different temperatures (e.g., set the transmission to operate at a higher gear in a high temperature environment to reduce the chances of overheating of a vehicle).

As another example, the different conditions of usage of the vehicle can include different altitudes at which the vehicle is to be operated, and the multiple parameter sets 108 can control adjustment of one or more respective adjustable elements of the vehicle for the respective different altitudes (e.g., change the timing of a valve to optimize engine operation at a high altitude).

As a further example, the different conditions of usage of the vehicle include different planned loads of the vehicle, where the multiple parameter sets 108 can control adjustment of one or more respective adjustable elements of the vehicle for the respective different planned loads (e.g., increase the stiffness of a suspension for a high load).

As another example, the different conditions of usage of the vehicle include different terrains over which the vehicle is to be operated and the multiple parameter sets 108 can control adjustment of one or more respective adjustable elements of the vehicle for the respective different terrains (e.g., reduce the stiffness of a suspension for rough terrain).

As a further example, the different conditions of usage of the vehicle include different expected travel distances of the vehicle, where the multiple parameter sets 108 can control adjustment of one or more respective adjustable elements of the vehicle for the respective different travel distances (e.g., adjust the engine and transmission for optimal performance at highway speeds).

Note that although FIG. 2 refers to determining a target condition of usage of a vehicle, selecting a parameter set based on the determined target condition of usage of the vehicle, and transmitting the selected parameter set to control a setting of one or more adjustable elements of the vehicle, the process of FIG. 2 can also be applied to multiple vehicles, such as multiple vehicles of a target group (which can be a given sub-fleet of vehicles) that is intended to be operated under a common target condition of usage (e.g., high or low temperature, high or low altitude, high or low load, a specific terrain, long or short haul, etc.)

Figure 3:
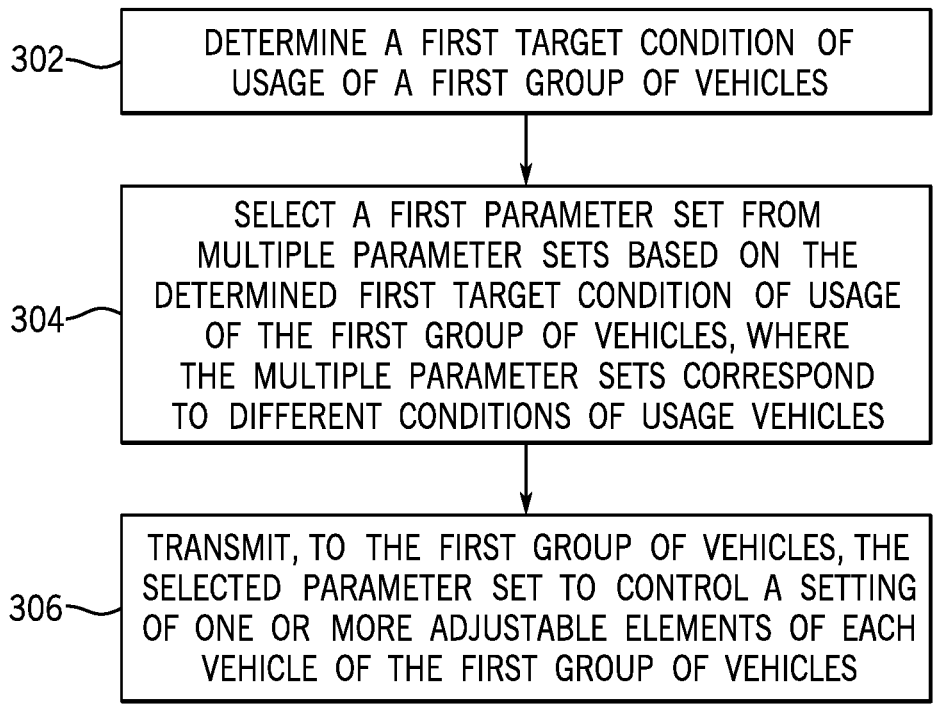
FIG. 3 is a flow diagram of a process of providing configuration settings to a group of vehicles, according to further implementations.

FIG. 3 is a flow diagram of a further example process of the present disclosure. The process of FIG. 3 can also be performed by the configuration management engine 104, for example. The process of FIG. 3 determines a first target condition of usage of a first group of vehicles (e.g., a first sub-fleet of vehicles). The process of FIG. 3 further includes selecting (at 304) a first parameter set from multiple parameter sets based on the determined first target condition of usage of the first group of vehicles, where the multiple parameter sets correspond to different conditions of usage of vehicles. The process of FIG. 3 further includes transmitting (at 306), to the first group of vehicles, the selected parameter set to control a setting of one or more adjustable elements of each vehicle of the first group of vehicles.

Autonomous Provision of Configuration Parameter Sets

The supervised provision of parameter sets to vehicles discussed above can be based on specification of sub-fleets of vehicles (such as by a fleet administrator) that are planned to be operated under specific respective conditions.

In further examples, rather than rely upon a pre-specified planned target condition of usage of vehicles, autonomous solutions to provide parameter sets to vehicles can use sensors on the vehicles to acquire measurement data that can be used for determining target conditions of usage of the vehicles.

Figure 4:
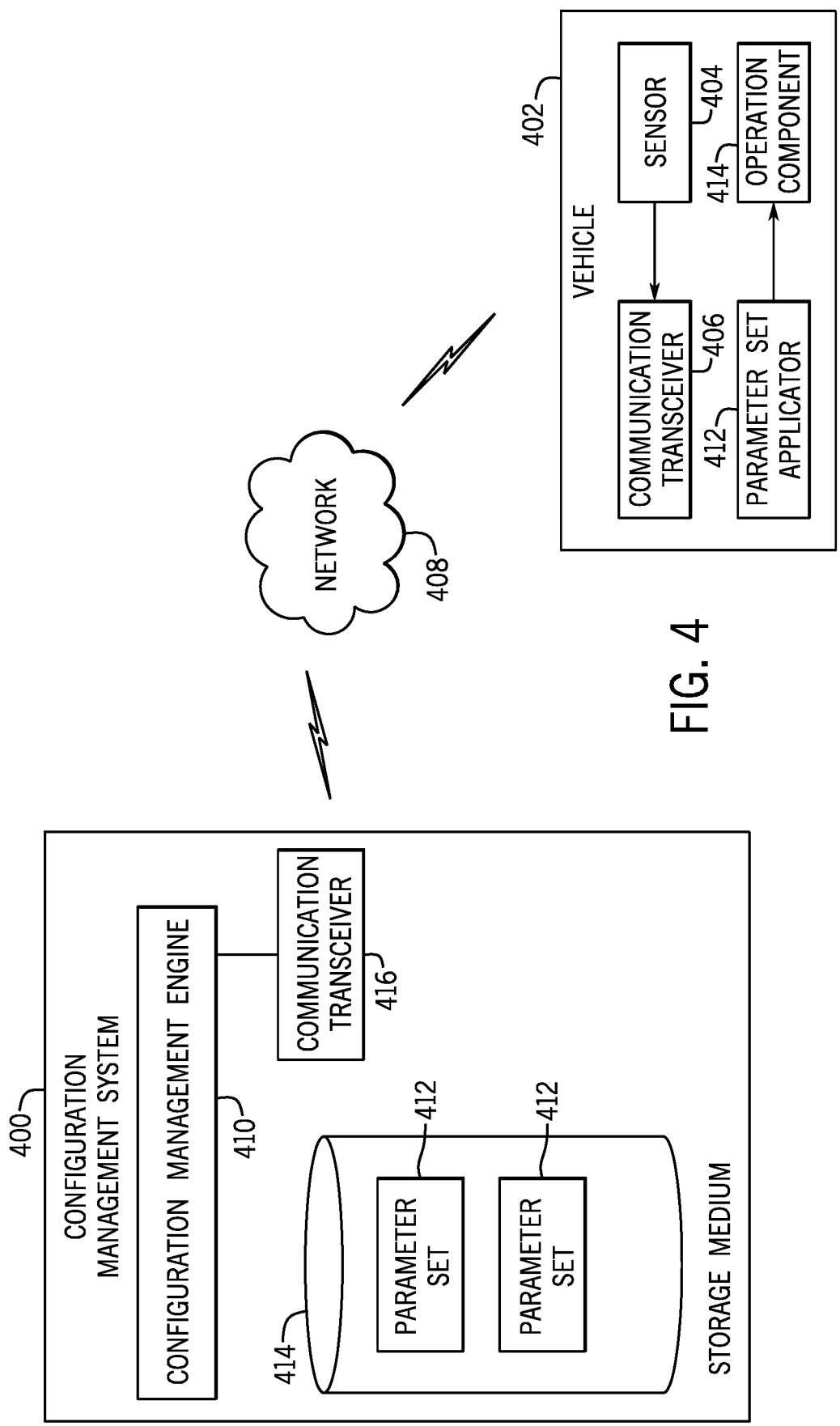
FIG. 4 is a block diagram of an example arrangement to provide configuration settings to vehicles according to alternative implementations.

FIG. 4 is a block diagram of an example arrangement that includes the configuration management system 400 and a vehicle 402 according to some examples. Although just one vehicle 402 is shown in FIG. 4, it is noted that multiple vehicles can be configured by the configuration management system 400.

The vehicle 402 includes a sensor 404, which can be used to acquire certain measurement information of the vehicle 402. For example, the sensor 404 can be a temperature sensor to measure a temperature of an environment around the vehicle 402, an altitude sensor to measure an altitude of the vehicle 402, a load sensor to measure a load of the vehicle 402, a terrain sensor to determine the type of terrain over which the vehicle 402 is travelling, a distance sensor to determine a travel distance of the vehicle 402, or any other type of sensor.

A load sensor can include a time-of-flight (ToF) sensor, where a light signal can be emitted, and reflection from a surface can be captured by a light sensor to determine a distance to the surface. This distance can provide an indication of a loading of the vehicle. In another example, the load sensor can include a weight sensor, such as a strain gauge or other type of weight sensor mounted to the suspensions of the vehicle. The measured weight provides an indication of loading of the vehicle.

A terrain sensor can include a camera to capture an image of the terrain, and to detect the type of terrain based on image processing of the captured image of the terrain. Alternatively or additionally, the terrain sensor can include a shock or vibration sensor to detect a force or vibration exerted on the vehicle as the vehicle moves over the pavement, which can give an indication of the type of terrain.

A distance sensor can include a position sensor (e.g., a global positioning system (GPS) receiver) to detect a location of the vehicle. Multiple measurements by the position sensor can provide an indication of a distance traveled by the vehicle. Alternatively, the distance sensor can be part of the odometer of the vehicle, and can output a distance traveled since a last reading of the odometer.

Although just one sensor 404 is depicted, it is noted that the vehicle 402 can include multiple sensors in other examples.

The vehicle 402 also includes a communication transceiver 406 to allow the vehicle 402 to communicate over a network 408 (wireless or wired network) with the configuration management system 400. The communication transceiver 406 can send measurement data from the sensor 404 over the network 408 to the configuration management system 400. The communication transceiver 406 can be a wireless transceiver to communicate wirelessly, or a wired transceiver to communicate over a wired network.

The configuration management system 400 includes a configuration management engine 410, which is able to receive measurement data from the sensor 404 of the vehicle 402, and determine, based on the measurement data from the sensor 404 of the vehicle 402, a condition of usage of the vehicle 402. The configuration management engine 410 can select a parameter set from multiple parameter sets 412 stored in a storage medium 414 based on the determined condition of usage of the vehicle 402.

The selected parameter set can be sent by the configuration management engine 410 through a communication transceiver 416 of the configuration management system 400 over the network 408 to the vehicle 402.

The parameter set received by the vehicle 402 is applied by a parameter set applicator 412 to an operational component 414 of the vehicle 402. The parameter set applicator 412 can write the parameter set received from the configuration management system 400 to the operational element 414, such as to store in a storage medium of the operational element 414. In examples where the operational component 414 is an ECU, the ECU can include a storage medium to store configuration information, and the parameter set can be written to the storage medium as part of the configuration information.

The parameter set applicator 412 can be implemented as a controller, which can be a hardware processing circuit or a combination of a hardware processing circuit and machine-readable instructions executable on the hardware processing circuit.

In alternative examples, instead of providing the configuration management engine 410 in the configuration management system 400 that is separate from the vehicle 402, the configuration management engine 410 can instead be provided in the vehicle 402, to select a parameter set to use (from multiple parameter sets) to use to control the operational component 414. In such examples, the configuration management engine 410 in the vehicle 402 can access the parameter sets 412, which can be stored in a storage medium of the vehicle 402, or alternatively, in a remote storage medium that is accessible by the vehicle 402 over the network 408.

Figure 5:
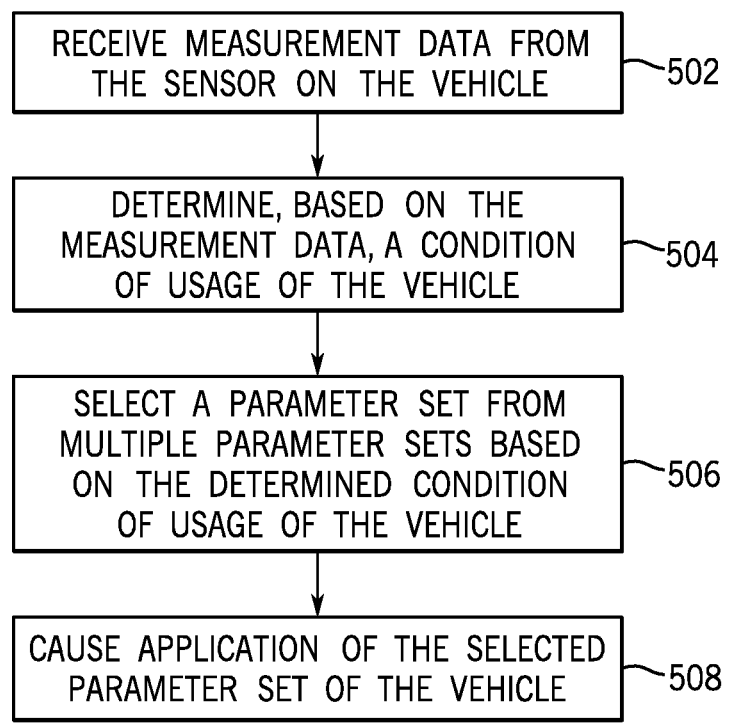
FIG. 5 is a flow diagram of an example process of providing a configuration setting to a vehicle based on sensor measurement data, according to alternative implementations.

FIG. 5 is a flow diagram of an example process according to the present disclosure, which can be performed by the configuration management engine 410 according to some examples. The configuration management engine 410 receives (at 502) measurement data from the sensor 404 on the vehicle 402. The configuration management engine 410 determines (at 504), based on the measurement data, a condition of usage of the vehicle 402. The configuration management engine 410 selects (at 506) a parameter set from the multiple parameter sets 412 based on the determined condition of usage of the vehicle 402. The configuration management engine 410 causes (at 508) application of the selected parameter set on the vehicle 402, such as by transmitting the selected parameter set over the network 408 to the vehicle 402 for application at the vehicle 402.

In some examples, the vehicle 402 may be initially configured with a first parameter set for a first condition of usage that was expected of the vehicle 402. However, based on the measurement data from the sensor 404, the configuration management engine 410 can detect that the determined condition of usage is different from the first condition of usage, such that the selected parameter set is different from the first parameter set for the first condition of usage. The selected parameter set can override the first parameter set when operating the respective operational component of the vehicle.

Although FIGS. 4 and 5 refer to the configuration management engine 410 selecting a parameter set for a vehicle, it is noted that in other examples, the configuration management engine 410 can select a parameter set for multiple vehicles. For example, the configuration management engine 410 can receive measurement data from sensors on multiple vehicles, and can determine, based on the measurement data from the sensors on the multiple vehicles, conditions of usage of the multiple vehicles.

The configuration management engine 410 is able to identify a subset of the multiple vehicles that operate in a similar condition of usage (e.g., the vehicles of the subset operate within a specified temperature range, the vehicles in the subset are long-haul vehicles, the vehicles in the subset operate within a specified altitude range, and so forth). The configuration management engine 410 can select, for the subset of the multiple vehicles, a parameter set from among multiple parameter sets for the condition of usage that is shared by the vehicles in the subset. The configuration management engine 410 can then cause application of the selected parameter set on the vehicles in the subset.

In some examples, the selecting of the parameter set for a vehicle (or multiple vehicles) based on a condition of usage determined from measurement data of a sensor can be unsupervised and does not rely on any input from a human user. Thus, based on the condition of usage determined from the measurement data acquired by the sensor of a vehicle, the configuration management engine 410 can autonomously select the parameter set to apply to the vehicle.

In other examples, the selection of the selected parameter set based on the condition of usage determined from the measurement data of the sensor can be first presented to a human user, such as an administrator at the client device 112 of FIG. 1. The administrator at the client device 112 can confirm or reject, such as by making a control selection in the management GUI 114, use of the selected parameter set.

Figure 6:
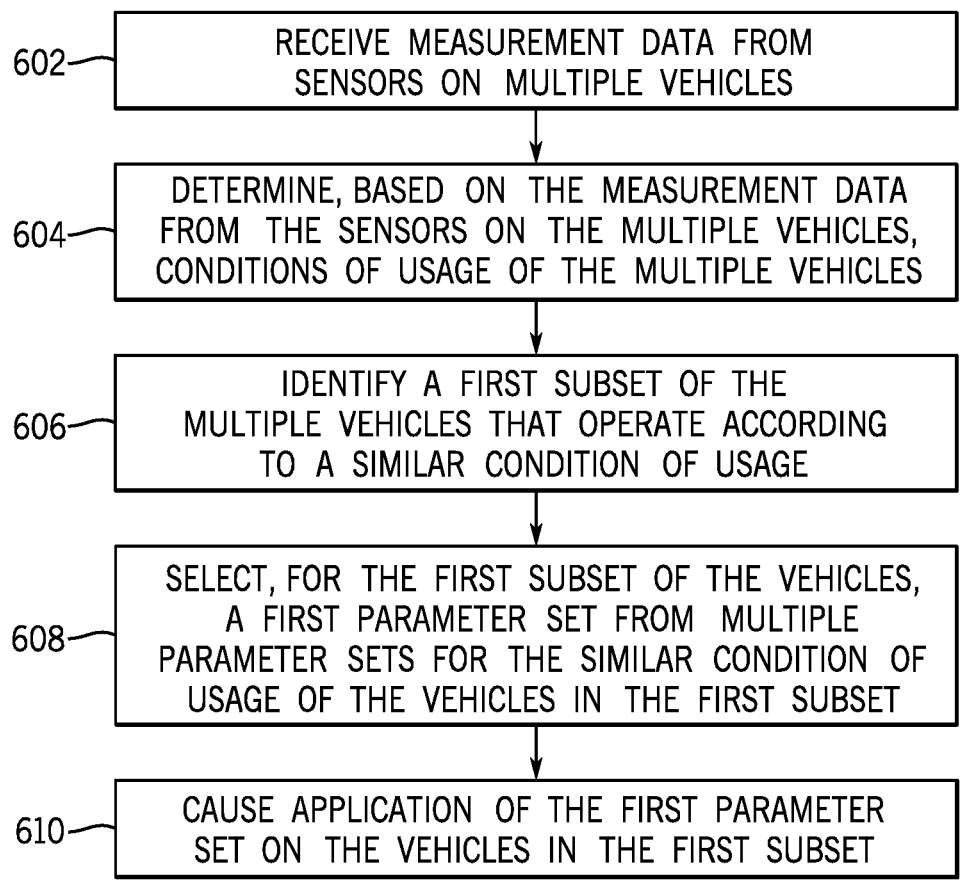
FIG. 6 is a flow diagram of another example process of providing configuration settings to vehicles, according to alternative implementations.

FIG. 6 is a flow diagram of a process according to further examples, which can be performed by the configuration management engine 410. The process of FIG. 6 includes receiving (at 602) measurement data from sensors on multiple vehicles. The process of FIG. 6 further determines (at 604), based on the measurement data from the sensors on the multiple vehicles, conditions of usage of the multiple vehicles. The process of FIG. 6 further includes identifying (at 606) a first subset of the multiple vehicles that operate according to a similar condition of usage. The process of FIG. 6 includes selecting (at 608), for the first subset of the vehicles, a first parameter set from multiple parameter sets for the similar condition of usage of the vehicles in the first subset. The process further includes causing (at 610) application of the first parameter set on the vehicles in the first subset.

System Architecture

Figure 7:
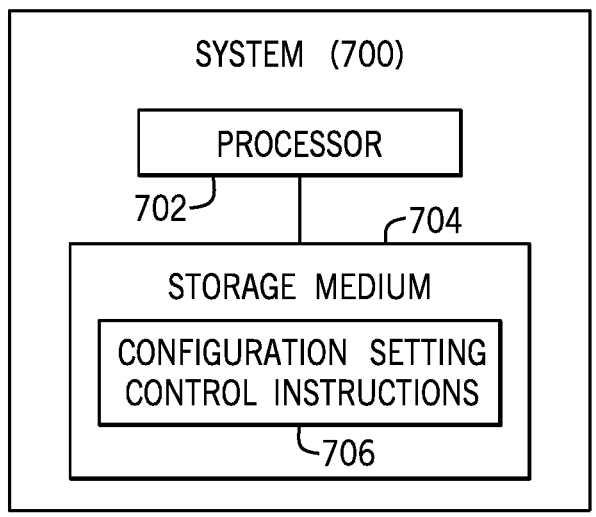
FIG. 7 is a block diagram of a system according to some examples.

FIG. 7 is a block diagram of a system 700 (which can be an example of the configuration management system 100 of FIG. 1 or configuration management system 400 of FIG. 4, or a controller in the vehicle 402 of FIG. 4). The system 700 includes a processor (or multiple processors) 702. A processor can include a microprocessor, a core of a multi-core microprocessor, a microcontroller, a programmable integrated circuit, a programmable gate array, or another hardware processing circuit.

The system 700 includes a non-transitory machine-readable or computer-readable storage medium 704, which stores machine-readable instructions, such as configuration setting control instructions 706 that are executable on the processor 702 to perform respective tasks, such as those of the configuration management engine 104 of FIG. 1 or configuration management engine 410 of FIG. 4. Instructions executable on a processor can refer to instructions executable on a single processor, or on multiple processors.

The storage medium 704 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by one or more processors, measurement data from a sensor on a vehicle;
determining, by the one or more processors based on the measurement data, a condition of usage of the vehicle;
selecting, by the one or more processors, a parameter set from among a plurality of parameter sets based on the determined condition of usage of the vehicle, the plurality of parameter sets corresponding to different conditions of usage of the vehicle, wherein a first parameter set of the plurality of parameter sets includes one or more parameters that control adjustment of timing of a valve of the vehicle and a second parameter set of the plurality of parameter sets includes one or more parameters that control adjustment of an operation of an adjustable aerodynamic shroud of the vehicle; and transmitting, by the one or more processors, the selected parameter set to the vehicle to cause application of the selected parameter set on the vehicle to control the adjustment of the timing of the valve of the vehicle or the adjustment of the operation of the adjustable aerodynamic shroud of the vehicle.

2. The method of claim 1, wherein the vehicle is initially configured with a third parameter set of the plurality of parameter sets for a first condition of usage, the method comprising:

detecting that the determined condition of usage is different from the first condition of usage, wherein the selected parameter set is different from the third parameter set.

3. The method of claim 1, wherein the selected parameter set is caused to be applied on the vehicle and overrides a previously configured parameter set at the vehicle.

4. The method of claim 1, wherein the plurality of parameter sets include a third parameter set including one or more parameters that, when the third parameter set is selected, control adjustment of one or more elements of an engine of the vehicle.

5. The method of claim 1, wherein the plurality of parameter sets include a third parameter set including one or more parameters that, when the third parameter set is selected, control adjustment of pressure of a tire of the vehicle.

6. The method of claim 1, wherein the different conditions of usage of the vehicle further comprise different terrains over which the vehicle is to be operated, and wherein the plurality of parameter sets include a third parameter set of the plurality of parameter sets including one or more parameters that, when the third parameter set is selected, control adjustment of one or more respective adjustable elements of the vehicle for respective terrains of the different terrains, the method further comprising:

receiving measured terrain data from a terrain sensor to detect a condition or type of terrain over which the vehicle travels, wherein the determined condition of usage of the vehicle is further based on the measured terrain data.

7. The method of claim 1, wherein the different conditions of usage of the vehicle further comprise different altitudes at which the vehicle is to be operated, and wherein the plurality of parameter sets include a third parameter set of the plurality of parameter sets including one or more parameters that, when the third parameter set is selected, control adjustment of one or more respective adjustable elements of the vehicle for respective altitudes of the different altitudes, the method further comprising:

receiving a measured altitude from an altitude sensor, wherein the determined condition of usage of the vehicle is further based on the measured altitude.

* * * * *